United States Patent
Jiang et al.

(10) Patent No.: US 9,081,397 B2
(45) Date of Patent: Jul. 14, 2015

(54) CONSTANT ON TIME MULTI-PHASE SWITCHING CONVERTER AND CONTROL METHOD THEREOF

(71) Applicant: Chengdu Monolithic Power Systems Co., Ltd., Chengdu (CN)

(72) Inventors: Lijie Jiang, Hangzhou (CN); Qian Ouyang, Hangzhou (CN); Xiaokang Wu, Hangzhou (CN); Bo Zhang, Hangzhou (CN); Suhua Luo, Hangzhou (CN); Yuancheng Ren, Hangzhou (CN); Eric Yang, Saratoga, CA (US)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 281 days.

(21) Appl. No.: 13/711,570

(22) Filed: Dec. 11, 2012

(65) Prior Publication Data

US 2013/0307498 A1    Nov. 21, 2013

(30) Foreign Application Priority Data

May 18, 2012    (CN) .......................... 2012 1 0154862

(51) Int. Cl.
*G05F 1/565*    (2006.01)
*G05F 1/10*    (2006.01)

(52) U.S. Cl.
CPC ........................................ *G05F 1/10* (2013.01)

(58) Field of Classification Search
USPC ......... 323/265, 268, 269, 271, 272, 282, 283, 323/351
See application file for complete search history.

(56) References Cited

U.S. PATENT DOCUMENTS

| | | | | |
|---|---|---|---|---|
| 6,362,608 | B1 * | 3/2002 | Ashburn et al. | 323/272 |
| 6,674,274 | B2 * | 1/2004 | Hobrecht et al. | 323/285 |
| 6,903,537 | B2 * | 6/2005 | Tzeng et al. | 323/268 |
| 7,030,596 | B1 * | 4/2006 | Salerno et al. | 323/282 |
| 7,071,660 | B2 * | 7/2006 | Xu et al. | 323/266 |
| 7,199,561 | B2 * | 4/2007 | Noma | 323/224 |
| 7,714,547 | B2 * | 5/2010 | Fogg et al. | 323/224 |
| 7,915,875 | B2 * | 3/2011 | Asuke et al. | 323/259 |
| 8,022,726 | B2 * | 9/2011 | Candage et al. | 326/59 |
| 8,400,129 | B2 * | 3/2013 | Ouyang | 323/283 |
| 8,476,879 | B2 * | 7/2013 | Gaboury et al. | 323/272 |
| 8,575,902 | B1 * | 11/2013 | Wei et al. | 323/269 |
| 2002/0125869 | A1 * | 9/2002 | Groom et al. | 323/283 |
| 2005/0184713 | A1 * | 8/2005 | Xu et al. | 323/282 |
| 2007/0035284 | A1 * | 2/2007 | Schoofs et al. | 323/283 |
| 2007/0229048 | A1 * | 10/2007 | Zambetti et al. | 323/282 |
| 2011/0025284 | A1 | 2/2011 | Xu et al. | |
| 2011/0188218 | A1 | 8/2011 | Hsing et al. | |
| 2011/0204859 | A1 * | 8/2011 | Prodic et al. | 323/271 |
| 2012/0274293 | A1 | 11/2012 | Ren et al. | |
| 2013/0069611 | A1 * | 3/2013 | Menegoli et al. | 323/284 |
| 2013/0193941 | A1 * | 8/2013 | DeFazio | 323/282 |
| 2014/0160601 | A1 * | 6/2014 | Ouyang | 361/18 |

* cited by examiner

*Primary Examiner* — Adolf Berhane
*Assistant Examiner* — Nusrat Quddus
(74) *Attorney, Agent, or Firm* — Perkins Coie LLP (57) ABSTRACT

A multi-phase switching converter comprising a plurality of switching circuits, a comparing circuit and a control circuit. The comparing circuit generates a comparison signal based on a reference signal and the output voltage of the multi-phase switching converter. The control circuit can turn on the following switching circuit based on the comparison signal only after the time from the current switching circuit being turned on reaches a first time threshold or the off-time of the current switching circuit reaches a second time threshold, wherein the first time threshold is longer than the second time threshold.

17 Claims, 11 Drawing Sheets

CONSTANT ON TIME MULTI-PHASE SWITCHING CONVERTER AND CONTROL METHOD THEREOF

CROSS-REFERENCE TO RELATED APPLICATION

This application claims the benefit of CN application 201210154862.0, filed on May 18, 2012, and incorporated herein by reference.

TECHNICAL FIELD

Embodiments of the present invention generally relate to electronic circuits, and more particularly but not exclusively to multi-phase switching converters and control methods thereof.

BACKGROUND

Switching converters with lower output voltage and higher output current are required in power solutions of high performance CPU. Multi-phase switching converters are widely used in these applications because of its good performance.

Figure 1:
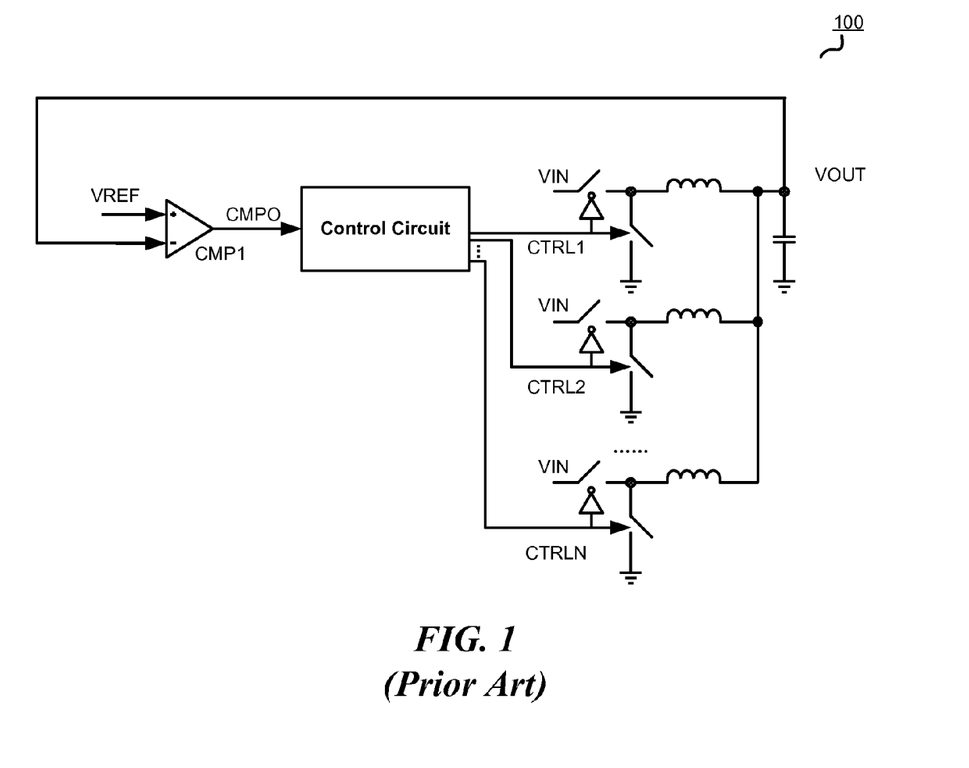
FIG. 1 is a block diagram of a prior multi-phase switching converter 100.

FIG. 1 is a block diagram of a prior multi-phase switching converter 100. The multi-phase switching converter 100 comprises N switching circuits, wherein N is an integer larger than or equal to 2. The input terminals of the N switching circuits are configured to receive an input voltage VIN, the output terminals of the N switching circuits are coupled together to provide an output voltage VOUT. The comparator CMP1 compares the output voltage VOUT with a reference signal VREF to generate a comparison signal CMPO. The control circuit generates control signals CTRL1~CTRLN based on the comparison signal CMPO to control the ON and OFF switching of the N switching circuits. Generally, when the comparison signal CMPO is logical high which indicates the output voltage VOUT is smaller than the reference signal, the control circuit turns on the corresponding switching circuit to provide energy to the load. The switching circuit is turned off by the control circuit when its on-time $t_{on}$ reaches a predetermined time threshold.

In prior art, the control circuit can turn on the following switching circuit based on the comparison signal CMPO only after the off-time of the current switching circuit reaches a minimum off-time $t_{min\_off\_time}$, so the N switching circuits can be turned on successively. However, the duty cycle of the multi-phase switching converter is limited. The multi-phase switching converter can not be used in the applications with duty cycle larger than (100/N) %. The maximum duty cycle $D_{max}$ can be described as:

$$D_{max} = \frac{t_{on}}{N(t_{on} + t_{min\_off\_time})} < \left(\frac{100}{N}\right)\% \quad (1)$$

Figure 2:
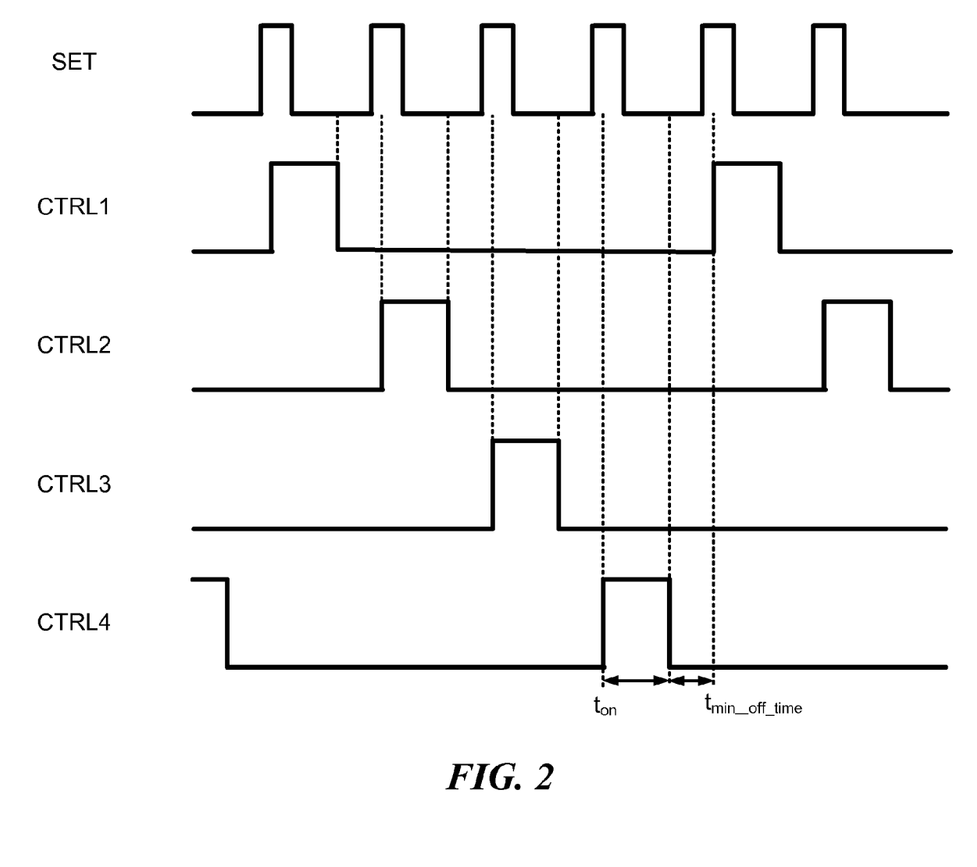
FIG. 2 is a working waveform of a prior 4-phase switching converter.

FIG. 2 is a working waveform of a prior 4-phase switching converter. According to the formula (1), the maximum duty cycle $D_{max}$ of the 4-phase switching converter is smaller than 25% and the 4-phase switching converter can not be used in the applications with duty cycle larger than 25%.

SUMMARY

The present invention is directed to a multi-phase switching converter comprising a plurality of switching circuits and a controller. The output terminals of the plurality of switching circuits are coupled together to provide an output voltage. The controller comprising a comparing circuit and a control circuit. Based on a reference signal and the output voltage, the comparing circuit generates a comparison signal. The control circuit is coupled to the comparing circuit to receive the comparison signal. Based on the comparison signal, the control circuit generates a plurality of control signals to turn on the plurality of switching circuits successively. The control circuit can turn on the following switching circuit based on the comparison signal only after the time from the current switching circuit being turned on reaches a first time threshold.

In one embodiment, when the on-time of the current switching circuit is longer than the difference between the first time threshold and a second time threshold, the control circuit can turn on the following switching circuit based on the comparison signal only after the time from the current switching circuit being turned on reaches the first time threshold. When the on-time of the current switching circuit is shorter than the difference between the first time threshold and the second time threshold, the control circuit can turn on the following switching circuit based on the comparison signal only after the off-time of the current switching circuit reaches a second time threshold. The first time threshold is longer than the second time threshold.

BRIEF DESCRIPTION OF THE DRAWINGS

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 3:
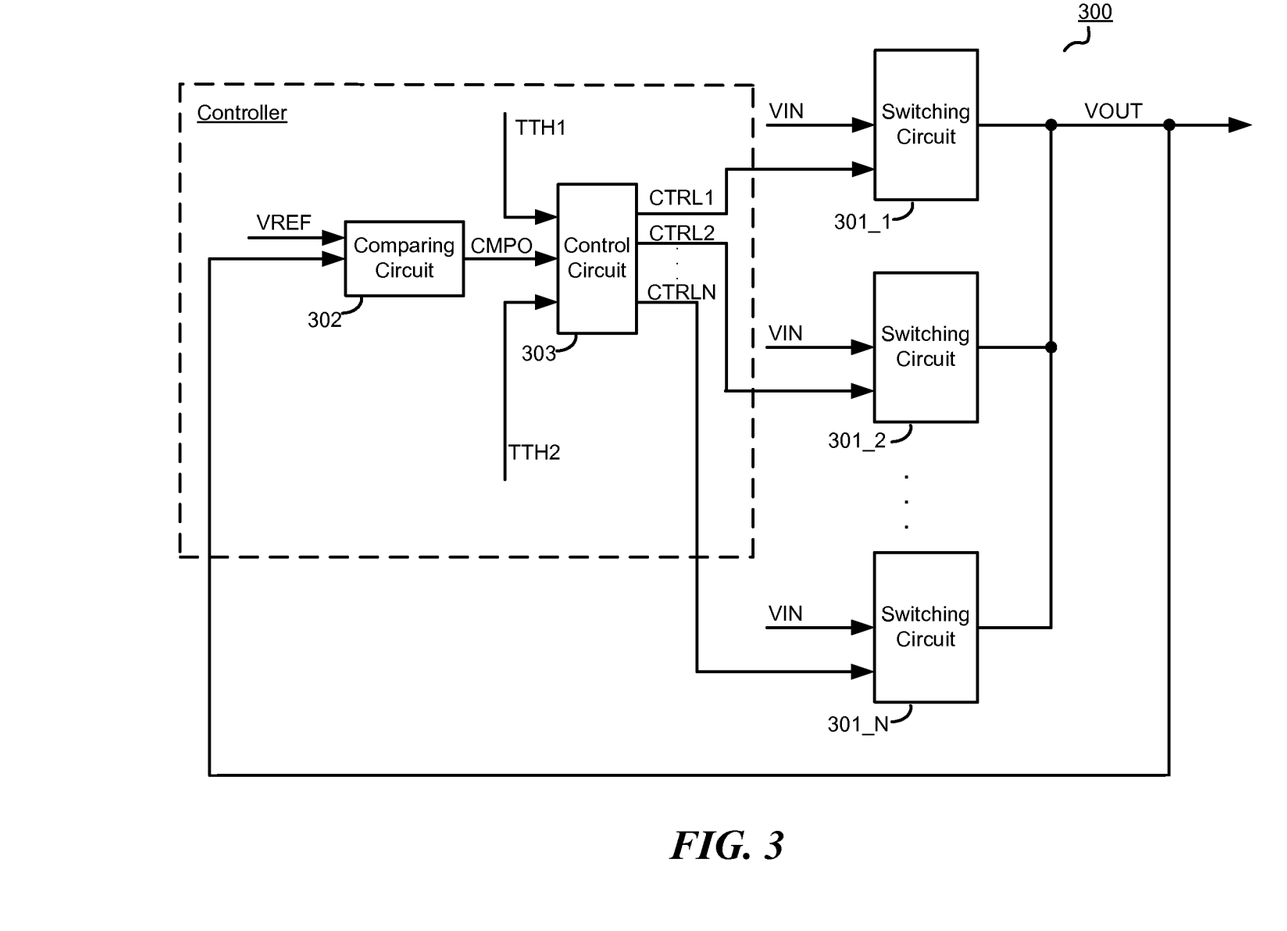
FIG. 3 is a block diagram of a multi-phase switching converter 300 in accordance with an embodiment of the present invention.

FIG. 3 is a block diagram of a multi-phase switching converter 300 in accordance with an embodiment of the present invention. The multi-phase switching converter 300 comprises a controller (as shown in the dotted line) and N switching circuits 301_1~301_N, wherein N is an integral larger than or equal to 2. The input terminals of the switching circuits 301_1~301_N are configured to receive an input voltage VIN, the output terminals of the switching circuits 301_1~301_N are coupled together to provide an output voltage VOUT. The switching circuits 301_1~301_N may be configured in any known DC/DC or AC/DC topology, such as BUCK converter, BOOST converter, Flyback converter and so on. The switches in the switching circuits 301_1~301_N may be any controllable semiconductor device, such as MOSFET (metal oxide semiconductor field effect transistor), IGBT (isolated gate bipolar transistor) and so on. The controller generates N control signals CTRL1~CTRLN to control the ON and OFF switching of the switching circuits 301_1~301_N.

The controller comprises a comparing circuit 302 and a control circuit 303. The comparing circuit 302 is coupled to the output terminals of the switching circuits 301_1~301_N to receive the output voltage VOUT. The comparing circuit 302 generates a comparison signal CMPO based on the output voltage VOUT and a reference signal VREF. The control circuit 303 is coupled to the comparing circuit 302 to receive the comparison signal CMPO. The control circuit 303 generates N control signals CTRL1~CTRLN based on the comparison signal CMPO to turn on the switching circuits 301_1~301_N successively, so the switching circuits 301_1~301_N can provide energy to the load successively The control circuit 303 can turn on the following switching circuit based on the comparison signal CMPO only after the time from the current switching circuit being turned on reaches a time threshold TTH1. Generally, the time threshold TTH1 is set to be shorter than Ts/N, wherein Ts is the switching period of a single switching circuit. As a result, under conditions with large duty cycle (e.g. the on-time $t_{on}$ is longer than Ts/N), the on-time of the adjacent two switching circuits can be partially overlapped, and the duty cycle of the multi-phase switching converter is not limited to (100/N) %. In one embodiment, the control circuit 303 turns on the corresponding switching circuit when the comparison signal CMPO indicates that the output voltage VOUT is smaller than the reference signal VREF.

In one embodiment, the control circuit 303 can turn on the following switching circuit based on the comparison signal CMPO only after either the time from the current switching circuit being turned on reaches the time threshold TTH1 or the off-time of the current switching circuit reaches a time threshold TTH2, wherein TTH1 is longer than TTH2.

Referring to FIG. 3, even the output voltage VOUT is still smaller than the reference signal VREF after the switching circuit 301_1 is turned on, the control circuit 303 will not turn on the following switching circuit 301_2 immediately. Only after the time from the switching circuit 301_1 being turned on reaches the time threshold TTH1 or the off-time of the switching circuit 301_1 reaches the time threshold TTH2, the control circuit 303 can turn on the switching circuit 301_2 while the output voltage VOUT is smaller than the reference signal VREF.

Similarly, even the output voltage VOUT is still smaller than the reference signal VREF after the switching circuit 301_K is turned on, the control circuit 303 will not turn on the following switching circuit 301_K+1 immediately, wherein K=1, 2, . . . , N−1. Only after the time from the switching circuit 301_K being turned on reaches the time threshold TTH1 or the off-time of the switching circuit 301_K reaches the time threshold TTH2, the control circuit 303 can turn on the switching circuit 301_K+1 while the output voltage VOUT is smaller than the reference signal VREF.

Likewise, even the output voltage VOUT is still smaller than the reference signal VREF after the switching circuit 301_N is turned on, the control circuit 303 will not turn on the following switching circuit 301_1 immediately. Only after the time from the switching circuit 301_N being turned on reaches the time threshold TTH1 or the off-time of the switching circuit 301_N reaches the time threshold TTH2, the control circuit 303 can turn on the switching circuit 301_1 while the output voltage VOUT is smaller than the reference signal VREF.

Under conditions with large duty cycle, the on-time $t_{on}$ of the switching circuit is longer than TTH1-TTH2 and the time threshold TTH1 is reached before the off-time of the current switching circuit reaches the time threshold TTH2. The control circuit 303 can turn on the following switching circuit based on the comparison signal CMPO after the time threshold TTH1 is reached. The on-time of the adjacent two switching circuits can be partially overlapped. So the maximum duty cycle of the multi-phase switching is not limited and the multi-phase switching 300 can satisfy the applications with large duty cycle. Under conditions with small duty cycle, the on-time $t_{on}$ of the switching circuit is shorter than TTH1-TTH2 and the off-time of the current switching circuit reaches the time threshold TTH2 before the time threshold TTH1 is reached. The control circuit 303 can turn on the following switching circuit based on the comparison signal CMPO after the off-time of current switching circuit reaches the time threshold TTH2. So the following switching circuit can be turned on timely when the load current is transient increased. As described above, the phase difference between the adjacent two switching circuits is automatically adjusted based on the work condition, so the multi-phase switching converter 300 shown in FIG. 3 can satisfy the requirement of the applications with large duty cycle and maintain good transient response under the condition with small duty cycle.

In one embodiment, when the load current is transient increased, the multi-phase switching converter 300 will turn on all or a part of the N switching circuits at the same time, so as to provide more current to the load.

Figure 4:
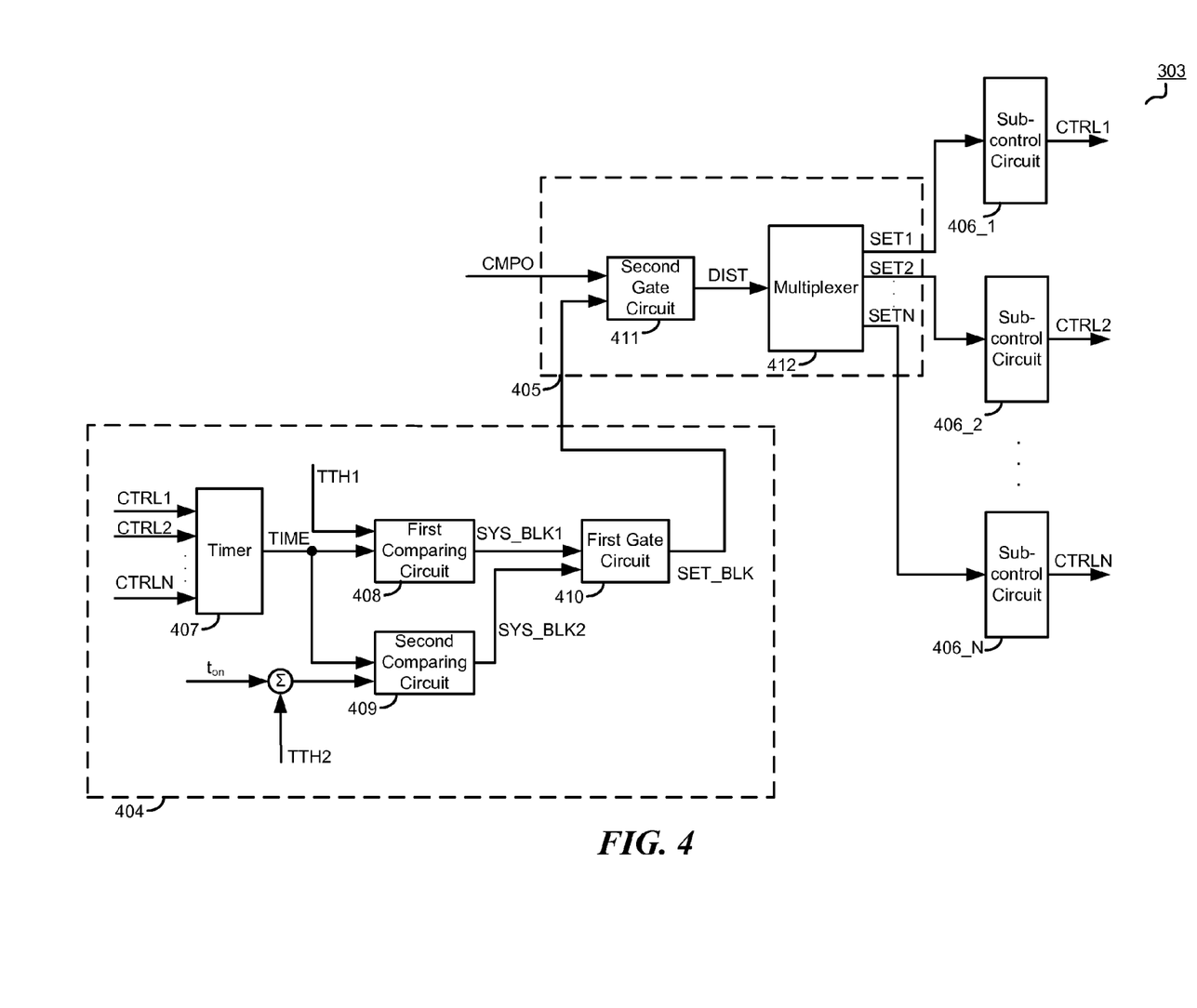
FIG. 4 illustrates a control circuit 303 shown in FIG. 3 in accordance with one embodiment of the present invention.

FIG. 4 illustrates a control circuit 303 shown in FIG. 3 in accordance with one embodiment of the present invention. The control circuit 303 comprises a detection circuit 404, a frequency divider 405 and N sub-control circuits 406_1~406_N. The detection circuit 404 detects whether the time from the current switching circuit being turned on reaches the time threshold TTH1 and whether the off-time of the current switching circuit reaches the time threshold TTH2, and generates a block signal SET_BLK. The frequency divider 405 has a first input terminal, a second input terminal and N output terminals, wherein the first input terminal is coupled to the comparing circuit to receive the comparison signal CMPO, the second input terminal is coupled to the detection circuit 404 to receive the block signal SET_BLK. Based on the comparison signal CMPO and the block signal SET_BLK, the frequency divider 405 generates N set signals SET1~SETN at the N output terminals. Each sub-control circuit 406_i has an input terminal and an output terminal (i=1, 2, ..., N), wherein the input terminal is coupled to the corresponding output terminal of the frequency divider 405 to receive the corresponding set signal SETi, the output terminal is coupled to the corresponding switching circuit to provide the corresponding control signal CTRLi.

In one embodiment, the detection circuit 404 comprises a timer 407, a first comparing circuit 408, a second comparing circuit 409 and a first gate circuit 410. The timer 407 has N input terminals and an output terminal, wherein the N input terminals are coupled to the sub-control circuits 406_1~406_N to receive the control signals CTRL1~CTRLN. Based on the control signal of the current switching circuit, the timer 407 generates a time signal TIME at its output terminal. The first comparing circuit 408 has a first input terminal, a second input terminal and an output terminal, wherein the first input terminal is coupled to the output terminal of the timer 407 to receive the time signal TIME, the second input terminal is configured to receive the time threshold TTH1. Based on the time signal TIME and the time threshold TTH1, the first comparing circuit 408 generates a first comparison signal SYS_BLK1 at its output terminal. The second comparing circuit 409 has a first input terminal, a second input terminal and an output terminal, wherein the first input terminal is coupled to the output terminal of the timer 407 to receive the time signal TIME, the second input terminal is configured to receive a sum of the on-time $t_{on}$ of the current switching circuit and the time threshold TTH2. Based on the time signal TIME, the on-time of the current switching circuit $t_{on}$ and the time threshold TTH2, the second comparing circuit 409 generates a second comparison signal SYS_BLK2 at its output terminal. The first gate circuit 410 has a first input terminal, a second input terminal and an output terminal, wherein the first input terminal is coupled to the output terminal of the first comparing circuit 408 to receive the first comparison signal SYS_BLK1, the second input terminal is coupled to the output terminal of the second comparing circuit 409 to receive the second comparison signal SYS_BLK2. Based on the first comparison signal SYS_BLK1 and second comparison signal SYS_BLK2, the first gate circuit 410 generates the block signal SET_BLK at its output terminal.

In one embodiment, the timer 407 starts to time when the current switching circuit is turned on (e.g. the corresponding control signal changes from logical low into logical high). The first comparison signal SYS_BLK1 and second comparison signal SYS_BLK2 are both logical high then. The first comparison signal SYS_BLK1 is changed into logical low when the time signal TIME reaches the time threshold TTH1. The second comparison signal SYS_BLK2 is changed into logical low when the time signal TIME reaches the sum of the on-time $t_{on}$ and the time threshold TTH2. The first gate circuit 410 is an AND gate and the frequency divider 405 only adjusts the set signals SET1~SETN when the block signal SET_BLK is logical low.

In one embodiment, the frequency divider 405 comprises a second gate circuit 411 and a multiplexer 412. The second gate circuit 411 has a first input terminal, a second input terminal and an output terminal, wherein the first input terminal is coupled to the detection circuit 404 to receive the block signal SET_BLK, the second input terminal is coupled to the comparing circuit to receive the comparison signal CMPO. Based on the block signal SET_BLK and the comparison signal CMPO, the second gate circuit 411 generates a pre-distribution signal DIST at its output terminal. The multiplexer 412 has an input terminal and N output terminals, wherein the input terminal is coupled to the output terminal of the second gate circuit 411 to receive the pre-distribution signal DIST. Through coupling the input terminals to the output terminals successively, the multiplexer 412 generates the set signals SET1~SETN at the output terminals.

Figure 5A:
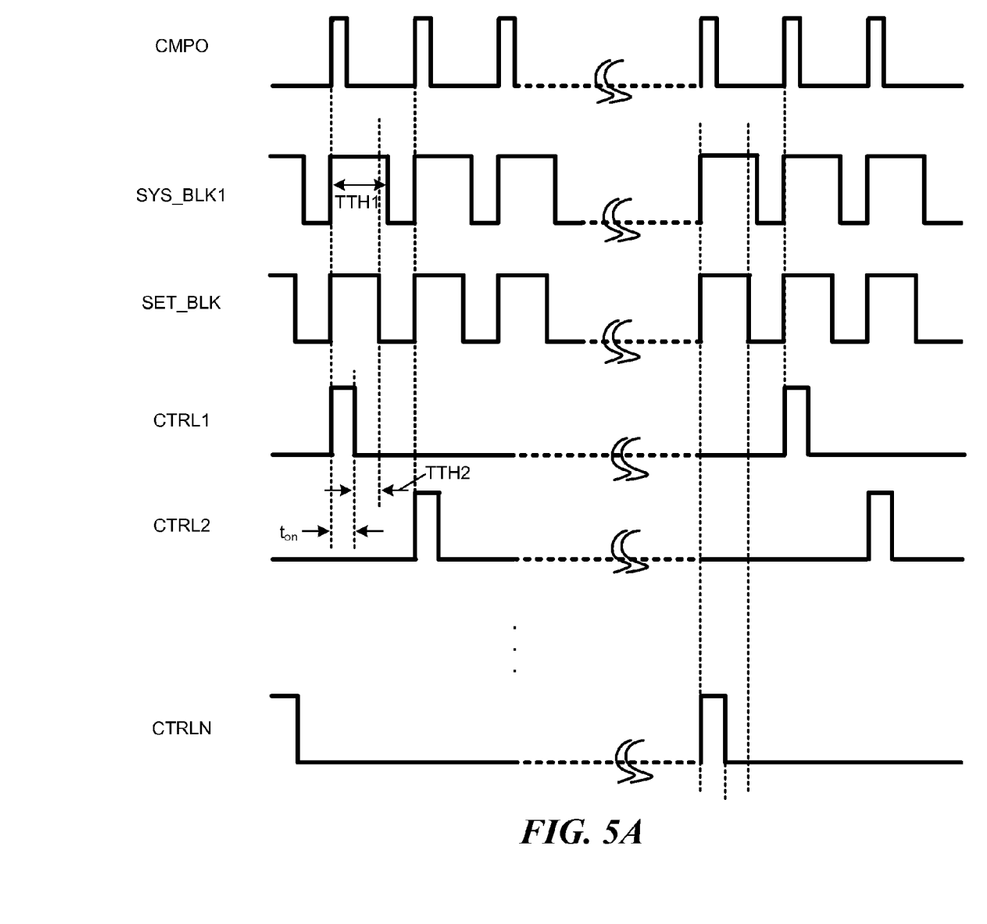
FIGS. 5A and 5B are working waveforms of the multi-phase switching converter 300 shown in FIG. 3 under different conditions in accordance with one embodiment of the present invention.
Figure 5B:
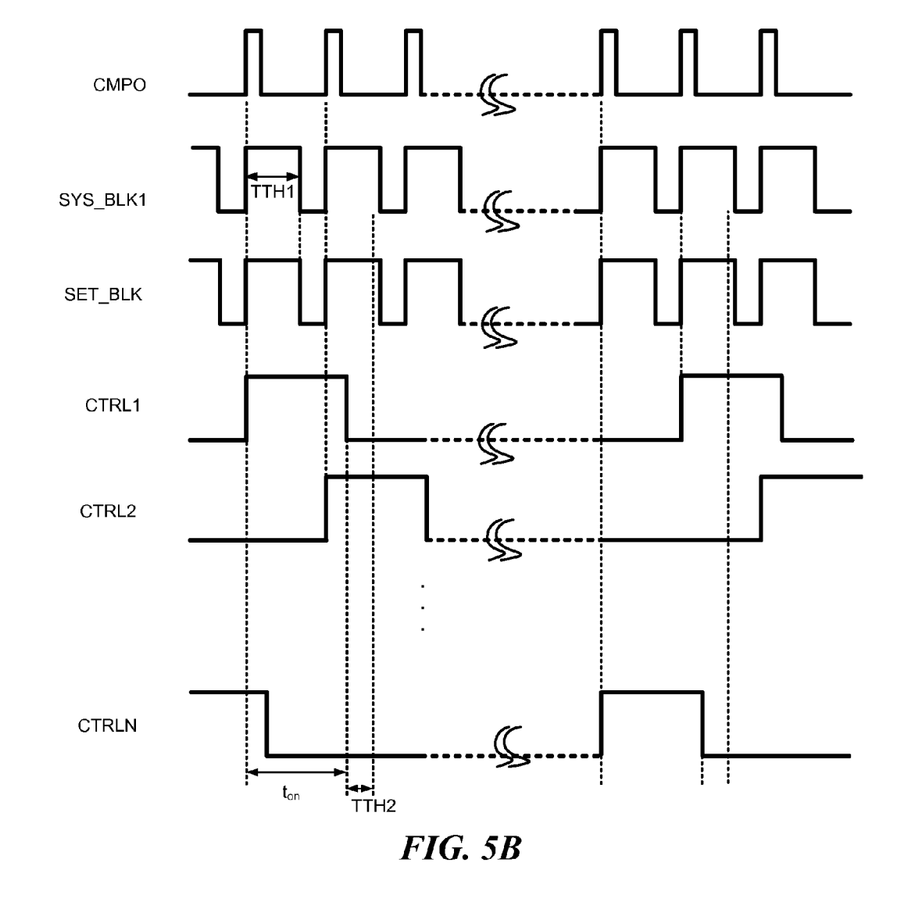

FIGS. 5A and 5B are working waveforms of the multi-phase switching converter 300 shown in FIG. 3 under different conditions in accordance with one embodiment of the present invention. FIG. 5A is a working waveform of the multi-phase switching converter 300 under small duty cycle. The sum of the on-time $t_{on}$ and the time threshold TTH2 is smaller than the time threshold TTH1. The off-time of current switching circuit reaches the time threshold TTH2 before the time threshold TTH1 is reached. So the control circuit 303 can turn on the following switching circuit based on the comparison signal CMPO after the off-time of current switching circuit reaches the time threshold TTH2.

FIG. 5B is a working waveform of the multi-phase switching converter 300 under large duty cycle. The sum of the on-time $t_{on}$ and the time threshold TTH2 is larger than the time threshold TTH1. The time threshold TTH1 is reached before the off-time of current switching circuit reaches the time threshold TTH2. So the control circuit 303 can turn on the following switching circuit based on the comparison signal CMPO after the time threshold TTH1 is reached.

Figure 6:
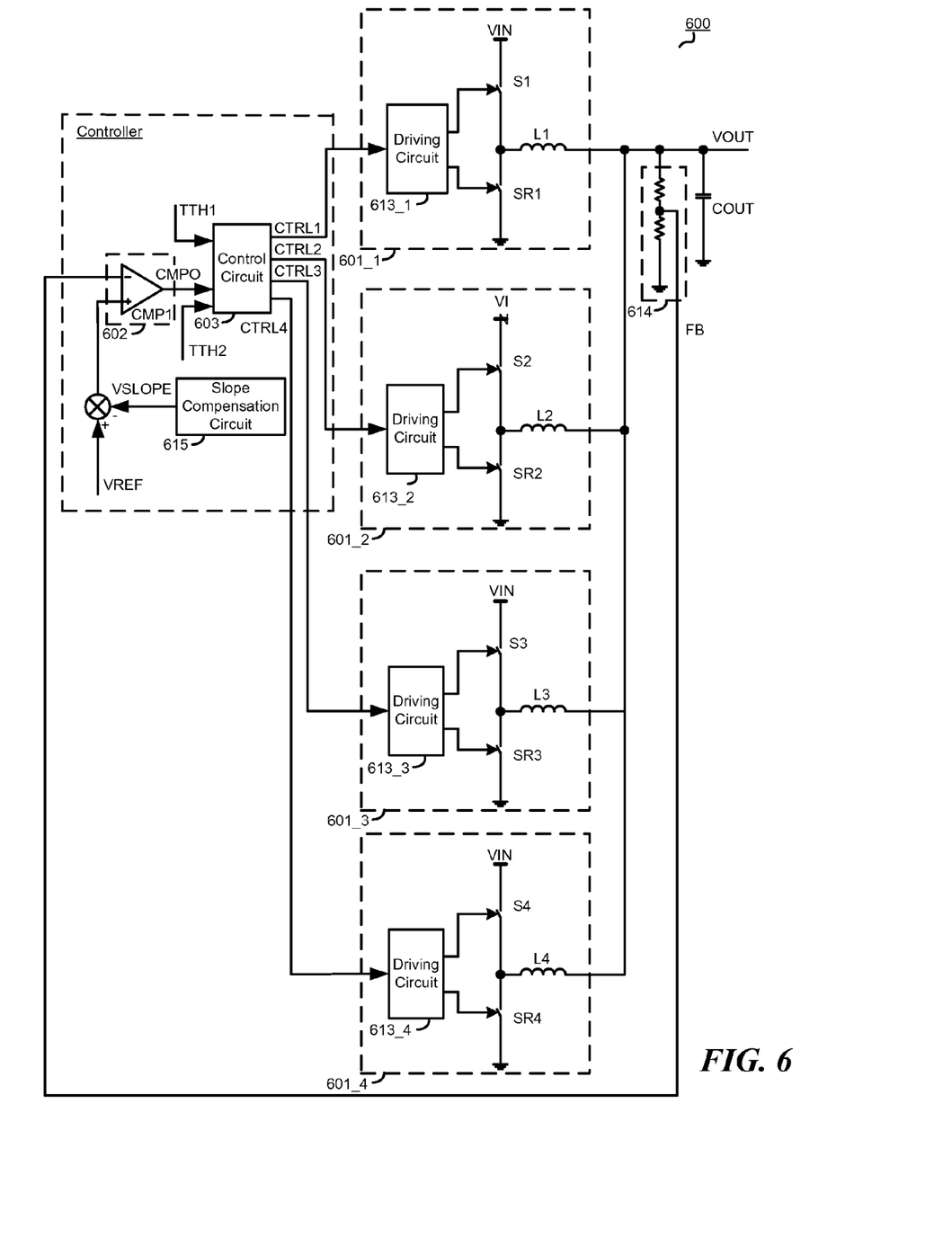
FIG. 6 illustrates a 4-phase switching converter 600 in accordance with one embodiment of the present invention.

FIG. 6 illustrates a 4-phase switching converter 600 in accordance with one embodiment of the present invention. The 4-phase switching converter 600 comprises a controller, a feedback circuit 614 and switching circuits 601_1~601_4. The controller comprises a comparing circuit 602 and a control circuit 603. The switching circuits 601_1~601_4 are all configured in BUCK converter. Each switching circuit 601_j comprises a driving circuit 613_j, switches Sj, SRj, and an inductor Lj, wherein j=1, 2, 3, 4.

The feedback circuit 614 has an input terminal and an output terminal, wherein the input terminal is coupled to the output terminals of the switching circuits 601_1~601_4 to receive the output voltage VOUT. The feedback circuit 614 generates a feedback signal FB representative of the output voltage VOUT at its output terminal. In one embodiment, the feedback circuit 614 comprises a resistor divider. The comparing circuit 602 comprises a comparator CMP1 having a non-inverting input terminal, an inverting input terminal and an output terminal. The non-inverting input terminal of the comparator CMP1 is configured to receive the reference signal VREF. The inverting input terminal is coupled to the output terminal of the feedback circuit 614 to receive the feedback signal FB. The comparison signal CMPO is provided at the output terminal of the comparator CMP1. The control circuit 603 generates control signals CTRL1~CTRL4 based on the comparison signal CMPO to control the ON and OFF switching of the switching circuits 601_1~601_4. The control circuit 603 can turn on the following switching circuit based on the comparison signal CMPO only after either the time from the current switching circuit being turned on reaches the time threshold TTH1 or the off-time of the current switching circuit reaches the time threshold TTH2.

In one embodiment, in order to eliminate the sub-harmonic oscillation in the output voltage VOUT, the controller further comprises a slope compensation circuit 615 configured to generate a slope compensation signal VSLOPE. The slope compensation signal VSLOPE may be added to the feedback signal VFB, or be subtracted from the reference signal VREF. In the illustrated embodiment, the slope compensation signal VSLOPE is subtracted from the reference signal VREF. In one embodiment, the slope compensation signal VSLOPE is set to maximum or is increased when the current switching circuit is turned on. The slope compensation signal VSLOPE is decreased after either the time from the current switching circuit being turned on reaches the time threshold TTH1 or the off-time of the current switching circuit reaches the time threshold TTH2.

Figure 7A:
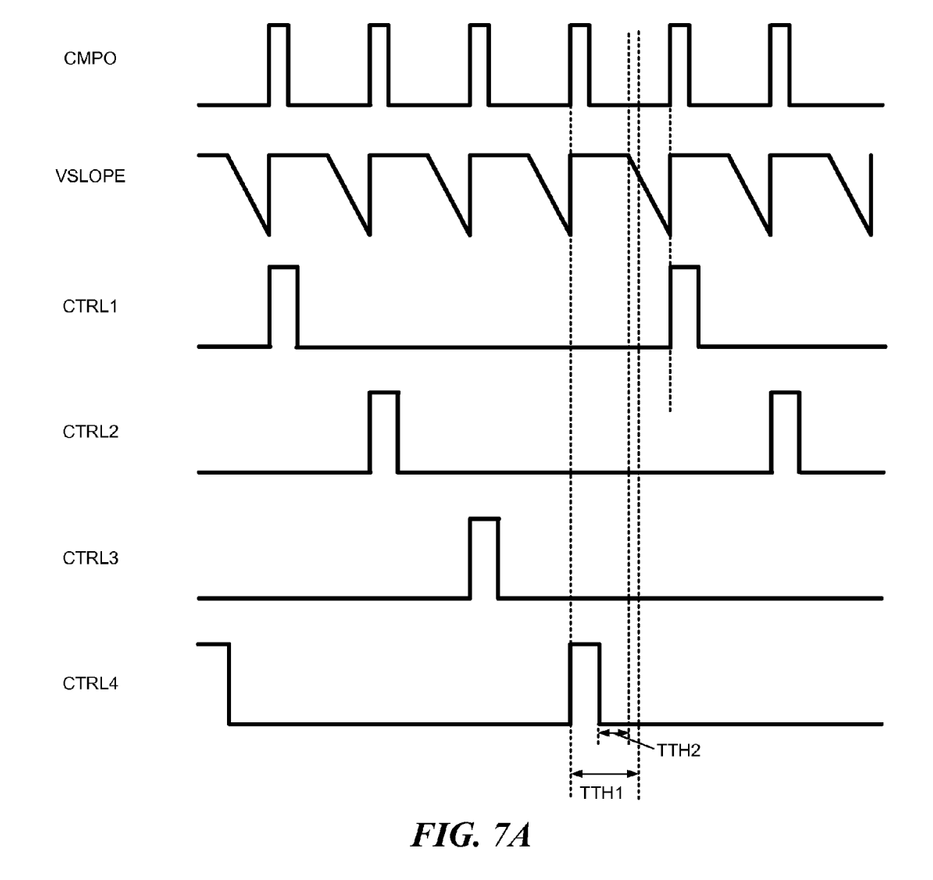
FIGS. 7A and 7B are working waveforms of the 4-phase switching converter 600 shown in FIG. 6 under different conditions in accordance with one embodiment of the present invention.
Figure 7B:
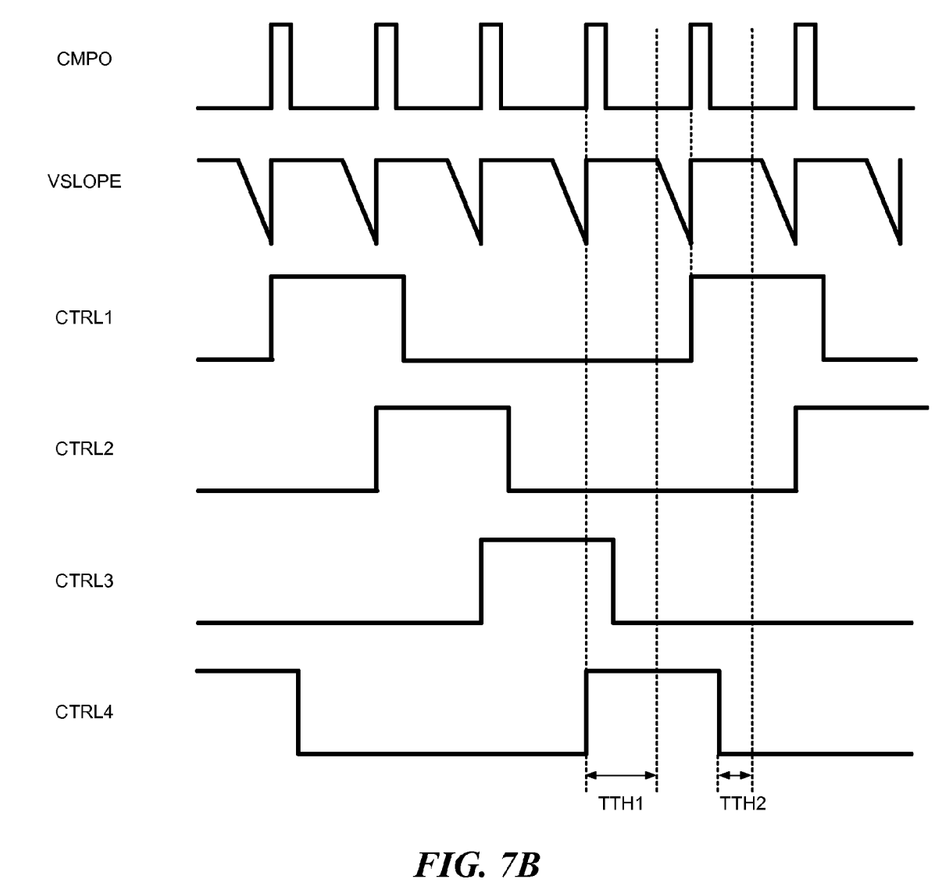

FIGS. 7A and 7B are working waveforms of the 4-phase switching converter 600 shown in FIG. 6 under different conditions in accordance with one embodiment of the present invention. FIG. 7A is a working waveform of the 4-phase switching converter 600 under small duty cycle. After the off-time of current switching circuit reaches the time threshold TTH2, the slope compensation signal VSLOPE is decreased, and the control circuit 603 can turn on the following switching circuit based on the comparison signal CMPO.

FIG. 7B is a working waveform of the 4-phase switching converter 600 under large duty cycle. After the time threshold TTH1 is reached, the slope compensation signal VSLOPE is decreased, and the control circuit 603 can turn on the following switching circuit based on the comparison signal CMPO.

Figure 8:
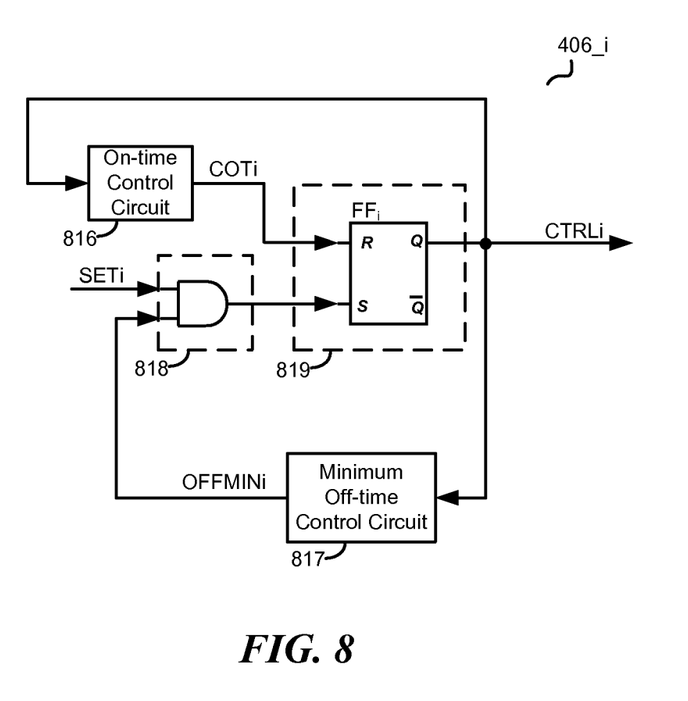
FIG. 8 illustrates a sub-control circuit shown in FIG. 4 in accordance with one embodiment of the present invention.

FIG. 8 illustrates a sub-control circuit shown in FIG. 4 in accordance with one embodiment of the present invention. The sub-control circuit 406_i comprises an on-time control circuit 816, a minimum off-time control circuit 817, a third gate circuit 818 and a logic circuit 819. The on-time control circuit 816 configured to generate an on-time control signal COTi to control the on-time $t_{on}$ of the corresponding switching circuit. The minimum off-time control circuit 817 is configured to generate a minimum off-time control signal OFFMINi to control the minimum off-time $t_{min\_offtime}$ of the corresponding switching circuit. The third gate circuit 818 has a first input terminal, a second input terminal and an output terminal, wherein the first input terminal is coupled to the corresponding output terminal of the frequency divider 405 to receive the corresponding set signal SETi, the second input terminal is coupled to the minimum off-time control circuit 817 to receive the minimum off-time control signal OFFMINi. Based on the set signal SETi and the minimum off-time control signal OFFMINi, the third gate circuit 818 generates a logical output signal at its output terminal. The logic circuit 819 has a first input terminal, a second input terminal and an output terminal, wherein the first input terminal is coupled to the output terminal of the on-time control circuit 816 to receive the on-time control signal COTi, the second input terminal is coupled to the output terminal of the third gate circuit 818 to receive the logical output signal. Based on the on-time control signal COTi and the logical output signal, the logic circuit 819 generates the corresponding control signal CTRLi at its output terminal. In one embodiment, the third gate circuit 808 is an AND gate and the logic circuit 819 is a RS flip-flop.

In one embodiment, the on-time $t_{on}$ of the switching circuit is set to a constant value, or a variable value related to the input voltage VIN and/or the output voltage VOUT. In one embodiment, the time threshold TTH2 is equal to the minimum off-time $t_{min\_off\_time}$.

In addition to the multi-phase switching converter described above, the present invention further provides a control method used in a multi-phase switching converter. The control method comprises: generating a comparison signal based on the output voltage of the multi-phase switching converter and a reference signal; based on the comparison signal; generating a control signal of the current switching circuit to turn on the current switching circuit; detecting whether the time from the current switching circuit being turned on reaches a time threshold TTH1; and generating a control signal of the following switching circuit to turn on the following switching circuit based on the comparison signal only after the time from the current switching circuit being turned on reaches the time threshold TTH1.

In one embodiment, the control method further comprises detecting whether the off-time of the current switching circuit reaches a time threshold TTH2. The following switching circuit can be turned on based on the comparison signal only after either the time from the current switching circuit being turned on reaches the time threshold TTH1 or the off-time of the current switching circuit reaches the time threshold TTH2, wherein TTH1 is longer than TTH2.

Figure 9:
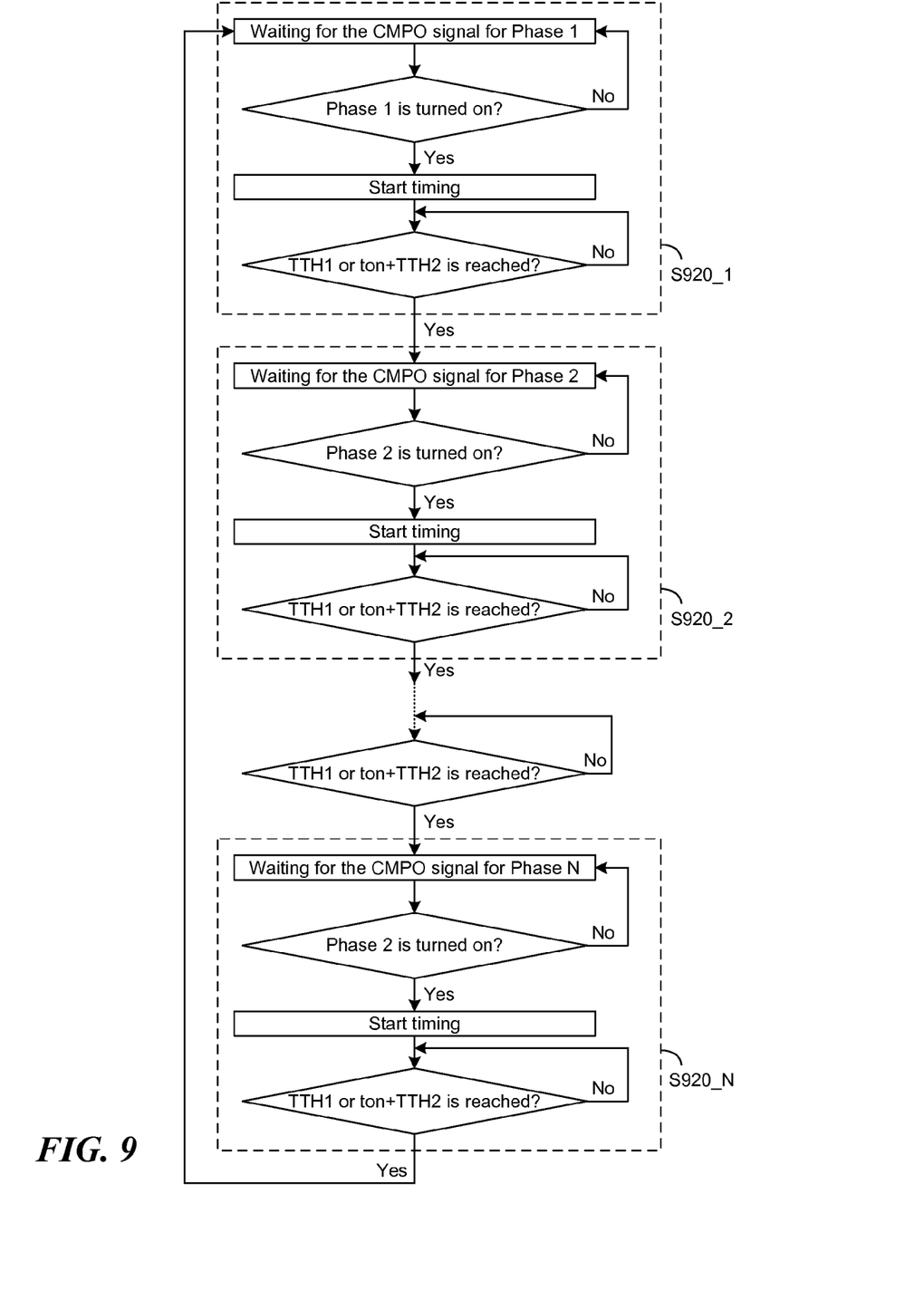
FIG. 9 is a flow chart of a control method used in a multi-phase switching converter, in accordance with an embodiment of the present invention.

FIG. 9 is a flow chart of a control method used in a multi-phase switching converter, in accordance with an embodiment of the present invention. The control method comprises stages S920_1~S920_N corresponding to the N switching circuits. In each stage, the switching circuit is turned on when the corresponding comparison signal is detected. Timing is started when the switching circuit is turned on. The time signal is compared with the time threshold TTH1, and also a sum of the on-time $t_{on}$ and the time threshold TTH2. If the time signal reaches TTH1 or $t_{on}$+TTH2, the next stage will be processed.

Obviously many modifications and variations of the present invention are possible in light of the above teachings. It is therefore to be understood that within the scope of the appended claims the invention may be practiced otherwise than as specifically described. It should be understood, of course, that the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

We claim:

1. A controller used in a multi-phase switching converter, wherein the multi-phase switching converter comprises a plurality of switching circuits, each of the plurality of switching circuits having an output terminal, and the output terminals are coupled together to provide an output voltage, the controller comprises:

a comparing circuit coupled to the output terminals of the plurality of switching circuits, wherein based on a reference signal and the output voltage, the comparing circuit generates a comparison signal; and a control circuit coupled to the comparing circuit to receive the comparison signal, wherein based on the comparison signal, the control circuit generates a plurality of control signals to turn on the plurality of switching circuits successively; wherein when the on-time of a current switching circuit of the plurality of switching circuits is longer than the difference between a first time threshold and a second time threshold, the control circuit can turn on a following switching circuit of the plurality of switching circuits based on the comparison signal only after the time from the current switching circuit being turned on reaches the first time threshold; and when the on-time of the current switching circuit is shorter than the difference between the first time threshold and the second time threshold, the control circuit can turn on the following switching circuit based on the comparison signal only after the off-time of the current switching circuit reaches a second time threshold, wherein the first time threshold is longer than the second time threshold.

2. The controller of claim 1, wherein the control circuit comprises:
   a detection circuit configured to detect whether the time from the current switching circuit being turned on reaches the first time threshold and whether the off-time of the current switching circuit reaches the second time threshold, and the detection circuit is configured to generate a block signal;
   a frequency divider having a first input terminal, a second input terminal and a plurality of output terminals, wherein the first input terminal is coupled to the comparing circuit to receive the comparison signal, the second input terminal is coupled to the detection circuit to receive the block signal, and wherein based on the comparison signal and the block signal, the frequency divider generates a plurality of set signals at the plurality of output terminals respectively; and
   a plurality of sub-control circuits, wherein each sub-control circuit has an input terminal and an output terminal, and wherein the input terminal is coupled to the corresponding output terminal of the frequency divider to receive the corresponding set signal, the output terminal is coupled to the corresponding switching circuit to provide the corresponding control signal.

3. The controller of claim 2, wherein the detection circuit comprises:
   a timer having a plurality of input terminals and an output terminal, wherein each of the plurality of input terminals is coupled to a corresponding sub-control circuit to receive a corresponding control signal, and wherein based on the control signal of the current switching circuit, the timer generates a time signal at the output terminal;
   a first comparing circuit having a first input terminal, a second input terminal and an output terminal, wherein the first input terminal is coupled to the output terminal of the timer to receive the time signal, the second input terminal is configured to receive the first time threshold, and wherein based on the time signal and the first time threshold, the first comparing circuit generates a first comparison signal at the output terminal;
   a second comparing circuit having a first input terminal, a second input terminal and an output terminal, wherein the first input terminal is coupled to the output terminal of the timer to receive the time signal, the second input terminal is configured to receive a sum of the on-time of the current switching circuit and the second time threshold, and wherein based on the time signal, the on-time of the current switching circuit and the second time threshold, the second comparing circuit generates a second comparison signal at the output terminal; and
   a first gate circuit having a first input terminal, a second input terminal and an output terminal, wherein the first input terminal is coupled to the output terminal of the first comparing circuit to receive the first comparison signal, the second input terminal is coupled to the output terminal of the second comparing circuit to receive the second comparison signal, and wherein based on the first and second comparison signals, the first gate circuit generates the block signal at the output terminal.

4. The controller of claim 2, wherein the frequency divider comprises:
   a second gate circuit having a first input terminal, a second input terminal and an output terminal, wherein the first input terminal is coupled to the detection circuit to receive the block signal, the second input terminal is coupled to the comparing circuit to receive the comparison signal, and wherein based on the block signal and the comparison signal, the second gate circuit generates a pre-distribution signal at the output terminal; and
   a multiplexer having an input terminal and a plurality of output terminals, wherein the input terminal is coupled to the output terminal of the second gate circuit to receive the pre-distribution signal, and wherein through coupling the input terminal to the plurality of output terminals successively, the multiplexer generates the plurality of set signals at the plurality of output terminals respectively.

5. The controller of claim 2, wherein each sub-control circuit comprises:
   an on-time control circuit configured to generate an on-time control signal to control the on-time of the corresponding switching circuit;
   a minimum off-time control circuit configured to generate a minimum off-time control signal to control the minimum off-time of the corresponding switching circuit;
   a third gate circuit having a first input terminal, a second input terminal and an output terminal, wherein the first input terminal is coupled to the corresponding output terminal of the frequency divider to receive the corresponding set signal, the second input terminal is coupled to the minimum off-time control circuit to receive the minimum off-time control signal, and wherein based on the set signal and the minimum off-time control signal, the third gate circuit generates a logical output signal at the output terminal; and
   a logic circuit having a first input terminal, a second input terminal and an output terminal, wherein the first input terminal is coupled to the output terminal of the on-time control circuit to receive the on-time control signal, the second input terminal is coupled to the output terminal of the third gate circuit to receive the logical output signal, and wherein based on the on-time control signal and the logical control signal, the logic circuit generates the corresponding control signal at the output terminal.

6. The controller of claim 5, wherein the second time threshold is equal to the minimum off-time.

7. The controller of claim 1, further comprises a slope compensation circuit configured to generate a slope compensation signal, wherein the slope compensation signal is added to the output voltage or a feedback signal representative of the output voltage, or the slope compensation signal is subtracted from the reference signal.

8. A multi-phase switching converter, comprising:
   a plurality of switching circuits, wherein each of the plurality of switching circuits has an output terminal, and the output terminals of the plurality of switching circuits are coupled together to provide an output voltage; and
   a controller comprising:
      a comparing circuit coupled to the output terminals of the plurality of switching circuits, wherein based on a reference signal and the output voltage, the comparing circuit generates a comparison signal; and
      a control circuit coupled to the comparing circuit to receive the comparison signal, wherein based on the comparison signal, the control circuit generates a plurality of control signals to turn on the plurality of switching circuits successively; wherein
      when the on-time of a current switching circuit of the plurality of switching circuits is longer than the difference between a first time threshold and a second time threshold, the control circuit can turn on a following switching circuit of the plurality of switching circuits based on the comparison signal only after the time from the current switching circuit being turned on reaches the first time threshold; and when the on-time of the current switching circuit is shorter than the difference between the first time threshold and the second time threshold, the control circuit can turn on the following switching circuit based on the comparison signal only after the off-time of the current switching circuit reaches a second time threshold, wherein the first time threshold is longer than the second time threshold.

9. The multi-phase switching converter of claim 8, wherein the control circuit comprises:

a detection circuit configured to detect whether the time from the current switching circuit being turned on reaches the first time threshold and whether the off-time of the current switching circuit reaches the second time threshold, and the detection circuit is configured to generate a block signal;

a frequency divider having a first input terminal, a second input terminal and a plurality of output terminals, wherein the first input terminal is coupled to the comparing circuit to receive the comparison signal, the second input terminal is coupled to the detection circuit to receive the block signal, and wherein based on the comparison signal and the block signal, the frequency divider generates a plurality of set signals at the plurality of output terminals respectively; and a plurality of sub-control circuits, wherein each sub-control circuit has an input terminal and output terminal, and wherein the input terminal is coupled to the corresponding output terminal of the frequency divider to receive the corresponding set signal, the output terminal is coupled to the corresponding switching circuit to provide the corresponding control signal.

10. The multi-phase switching converter of claim 9, wherein the detection circuit comprises:

a timer having a plurality of input terminals and an output terminal, wherein each of the plurality of input terminals is coupled to a corresponding sub-control circuit to receive a corresponding control signal, and wherein based on the control signal of the current switching circuit, the timer generates a time signal at the output terminal;

a first comparing circuit having a first input terminal, a second input terminal and an output terminal, wherein the first input terminal is coupled to the output terminal of the timer to receive the time signal, the second input terminal is configured to receive the first time threshold, and wherein based on the time signal and the first time threshold, the first comparing circuit generates a first comparison signal at the output terminal;

a second comparing circuit having a first input terminal, a second input terminal and an output terminal, wherein the first input terminal is coupled to the output terminal of the timer to receive the time signal, the second input terminal is configured to receive a sum of the on-time of the current switching circuit and the second time threshold, and wherein based on the time signal, the on-time of the current switching circuit and the second time threshold, the second comparing circuit generates a second comparison signal at the output terminal; and a first gate circuit having a first input terminal, a second input terminal and an output terminal, wherein the first input terminal is coupled to the output terminal of the first comparing circuit to receive the first comparison signal, the second input terminal is coupled to the output terminal of the second comparing circuit to receive the second comparison signal, and wherein based on the first and second comparison signals, the first gate circuit generates the block signal at the output terminal.

11. The multi-phase switching converter of claim 9, wherein the frequency divider comprises:

a second gate circuit having a first input terminal, a second input terminal and an output terminal, wherein the first input terminal is coupled to the detection circuit to receive the block signal, the second input terminal is coupled to the comparing circuit to receive the comparison signal, and wherein based on the block signal and the comparison signal, the second gate circuit generates a pre-distribution signal at the output terminal; and a multiplexer having an input terminal and a plurality of output terminals, wherein the input terminal is coupled to the output terminal of the second gate circuit to receive the pre-distribution signal, and wherein through coupling the input terminal to the plurality of output terminals successively, the multiplexer generates the plurality of set signals at the plurality of output terminals respectively.

12. The multi-phase switching converter of claim 9, wherein each sub-control circuit comprises:

an on-time control circuit configured to generate an on-time control signal to control the on-time of the corresponding switching circuit;

a minimum off-time control circuit configured to generate a minimum off-time control signal to control the minimum off-time of the corresponding switching circuit;

a third gate circuit having a first input terminal, a second input terminal and an output terminal, wherein the first input terminal is coupled to the corresponding output terminal of the frequency divider to receive the corresponding set signal, the second input terminal is coupled to the minimum off-time control circuit to receive the minimum off-time control signal, and wherein based on the set signal and the minimum off-time control signal, the third gate circuit generates a logical output signal at the output terminal; and a logic circuit having a first input terminal, a second input terminal and an output terminal, wherein the first input terminal is coupled to the output terminal of the on-time control circuit to receive the on-time control signal, the second input terminal is coupled to the output terminal of the third gate circuit to receive the logical output signal, and wherein based on the on-time control signal and the logical control signal, the logic circuit generates the corresponding control signal at the output terminal.

13. The multi-phase switching converter of claim 12, wherein the second time threshold is equal to the minimum off-time.

14. A control method used in a multi-phase switching converter, wherein the multi-phase switching converter comprises a plurality of switching circuits, each of the plurality of switching circuits having an output terminal, and the output terminals of the plurality of switching circuits are coupled together to provide an output voltage, the control method comprises:

generating a comparison signal based on the output voltage and a reference signal;

based on the comparison signal, generating a control signal of the current switching circuit to turn on the current switching circuit;

detecting whether the time from the current switching circuit being turned on reaches a first time threshold;

detecting whether the off-time of the current switching circuit reaches a second time threshold; and generating a control signal of the following switching circuit to turn on the following switching circuit based on the comparison signal only after either the time from the current switching circuit being turned on reaches the first time threshold or the off-time of the current switching circuit reaches the second time threshold, wherein the first time threshold is longer than the second time threshold.

15. The control method of claim 14, wherein the step of detecting comprises:

generating a time signal based on the control signal of the current switching circuit;

comparing the time signal with the first time threshold; and comparing the time signal with a sum of the on-time of the current switching circuit and the second time threshold.

16. The control method of claim 14, wherein the step of generating a control signal based on the comparison signal comprises:

generating a set signal based on the comparison signal;

generating an on-time control signal to control the on-time of the switching circuit;

generating a minimum off-time control signal to control the minimum off-time of the switching circuit;

generating a logical output signal based on the set signal and the minimum off-time control signal; and generating the control signal based on the on-time control signal and the logical output signal.

17. The control method of claim 16, wherein the second time threshold is equal to the minimum off-time.

* * * * *